US010761515B2

(12) United States Patent
Shimamura et al.

(10) Patent No.: US 10,761,515 B2
(45) Date of Patent: Sep. 1, 2020

(54) CONTROL SYSTEM FOR CONTROLLING CONTROL OBJECT AND CONTROL DEVICE FOR LINKING CONTROL APPLICATIONS IN CONTROL SYSTEM

(71) Applicant: OMRON Corporation, Kyoto (JP)

(72) Inventors: Junji Shimamura, Takatsuki (JP); Fumimasa Katayama, Muko (JP)

(73) Assignee: OMRON Corporation, Kyoto (JP)

( * ) Notice: Subject to any disclaimer, the term of this patent is extended or adjusted under 35 U.S.C. 154(b) by 165 days.

(21) Appl. No.: 16/005,687

(22) Filed: Jun. 12, 2018

(65) Prior Publication Data
US 2019/0101904 A1 Apr. 4, 2019

(30) Foreign Application Priority Data
Sep. 29, 2017 (JP) ................. 2017-190345

(51) Int. Cl.
G05B 19/418 (2006.01)
G05B 19/05 (2006.01)
G05B 15/02 (2006.01)
G05B 19/042 (2006.01)

(52) U.S. Cl.
CPC ....... *G05B 19/41825* (2013.01); *G05B 15/02* (2013.01); *G05B 19/0421* (2013.01); *G05B 19/0426* (2013.01); *G05B 19/0428* (2013.01); *G05B 19/052* (2013.01); *G05B 19/4187* (2013.01); *G05B 19/41835* (2013.01); *G05B 2219/1211* (2013.01); *G05B 2219/15014* (2013.01); *G05B 2219/25266* (2013.01)

(58) Field of Classification Search
None
See application file for complete search history.

(56) References Cited

U.S. PATENT DOCUMENTS
6,411,857 B1 6/2002 Flood

FOREIGN PATENT DOCUMENTS
EP 2680095 1/2014
JP 2001027904 1/2001
JP 2016092544 5/2016

OTHER PUBLICATIONS
"Search Report of Europe Counterpart Application", dated Dec. 14, 2018, p. 1-p. 10.

*Primary Examiner* — Eric C Wai
(74) *Attorney, Agent, or Firm* — JCIPRNET

(57) ABSTRACT

A configuration of control device capable of linking control applications even in a control system that combines a control device with another control device is provided. A first control device includes: a first program execution part outputting a first control command at every first cycle; a parsing part parsing at least a part of a first application program at every second cycle to sequentially generate an internal command; a command calculation part outputting a second control command at every first cycle according to the internal command generated by the parsing part; and an arbitration part managing a parsing process performed by the parsing part. The arbitration part adjusts an output timing of the second control command according to the internal command generated by the parsing part in response to notification of a timing from the second control device.

20 Claims, 13 Drawing Sheets

CONTROL SYSTEM FOR CONTROLLING CONTROL OBJECT AND CONTROL DEVICE FOR LINKING CONTROL APPLICATIONS IN CONTROL SYSTEM

CROSS-REFERENCE TO RELATED APPLICATION

This application claims the priority benefit of Japan application serial no. 2017-190345, filed on Sep. 29, 2017. The entirety of the above-mentioned patent application is hereby incorporated by reference herein and made a part of this specification.

BACKGROUND

Technical Field

The disclosure relates to a control system for controlling a control object and a control device that constitutes the control system.

Description of Related Art

Various FA (Factory Automation) technologies have been used widely at production sites. Such FA systems may include not only control devices such as PLC (programmable logic controller) but also various devices that are capable of performing advanced operations such as CNC (computer numerical control) and robot. Such FA systems tend to be larger in scale.

For example, Japanese Laid-open Patent Application No. 2001-027904 discloses a numerical control system that can increase the number of axes under control by connecting multiple CNC devices, and synchronize the CNC devices. In this numerical control system, a master unit and one or more slave units are connected via a cable. The master unit and the slave units each have a PMC processor and a CNC processor for executing a ladder program.

In addition, Japanese Laid-open Patent Application No. 2016-092544 discloses a control system that controls a first control object by a master control device and controls a second control object, different from the first control object, by a slave control device connected to the master control device via a network. This control system includes the master control device and the slave control device. Apart from the controller that has an arithmetic processing part, the master control device and the slave control device each include a robot controller having another arithmetic processing part.

As the ICT (information and communication technology) advances in recent years, the processing capability of control devices is also improving dramatically. There is also a need to realize the FA system, which has been realized with use of multiple dedicated devices in the related art, with fewer control devices.

In the configurations disclosed in the aforementioned patent documents, a plurality of processors or arithmetic processing parts are dispersively arranged, and in order to achieve synchronous processing between the processors or arithmetic processing parts, the configurations may become redundant.

However, not all types of programs (e.g., ladder program, CNC program, robot program, etc.) in different execution formats can be realized with one single control device. It is possible that the processing in some dedicated devices is taken into the control device while the remaining dedicated devices remain unchanged. The disclosure provides a configuration that makes it possible to link with a CNC machine tool or robot even in a control system that combines a control device with another control device.

SUMMARY

According to an embodiment of the disclosure, a control system includes a first control device, a second control device network-connected to the first control device, and one or more actuators operated according to a control command from the first control device. The first control device and the second control device include timers that are synchronized with each other in time. The first control device includes a first program execution part executing a sequence program at every first cycle to output a first control command; a parsing part parsing at least a part of a first application program at every second cycle, which is equal to or longer than the first cycle, to sequentially generate an internal command; a command calculation part outputting a second control command to at least a part of the one or more actuators at every first cycle according to the internal command generated by the parsing part; and an arbitration part managing a parsing process performed by the parsing part. The second control device includes a second program execution part sequentially parsing a second application program to output a third control command to a target movable machine; and a timing management part notifying in advance the first control device of a timing of outputting the third control command. The arbitration part adjusts an output timing of the second control command according to the internal command generated by the parsing part in response to notification of the timing from the second control device.

According to another embodiment of the disclosure, a control device network-connected to a control application is provided. The control device includes a first program execution part executing a sequence program at every first cycle to output a first control command; a parsing part parsing at least a part of an application program at every second cycle, which is equal to or longer than the first cycle, to sequentially generate an internal command; a command calculation part outputting a second control command to at least a part of one or more actuators at every first cycle according to the internal command generated by the parsing part; and an arbitration part managing a parsing process performed by the parsing part based on notification of a timing of outputting a control command from the control application. The arbitration part adjusts an output timing of the second control command according to the internal command generated by the parsing part in response to notification of the timing from the control application.

DESCRIPTION OF THE EMBODIMENTS

Figure 1:
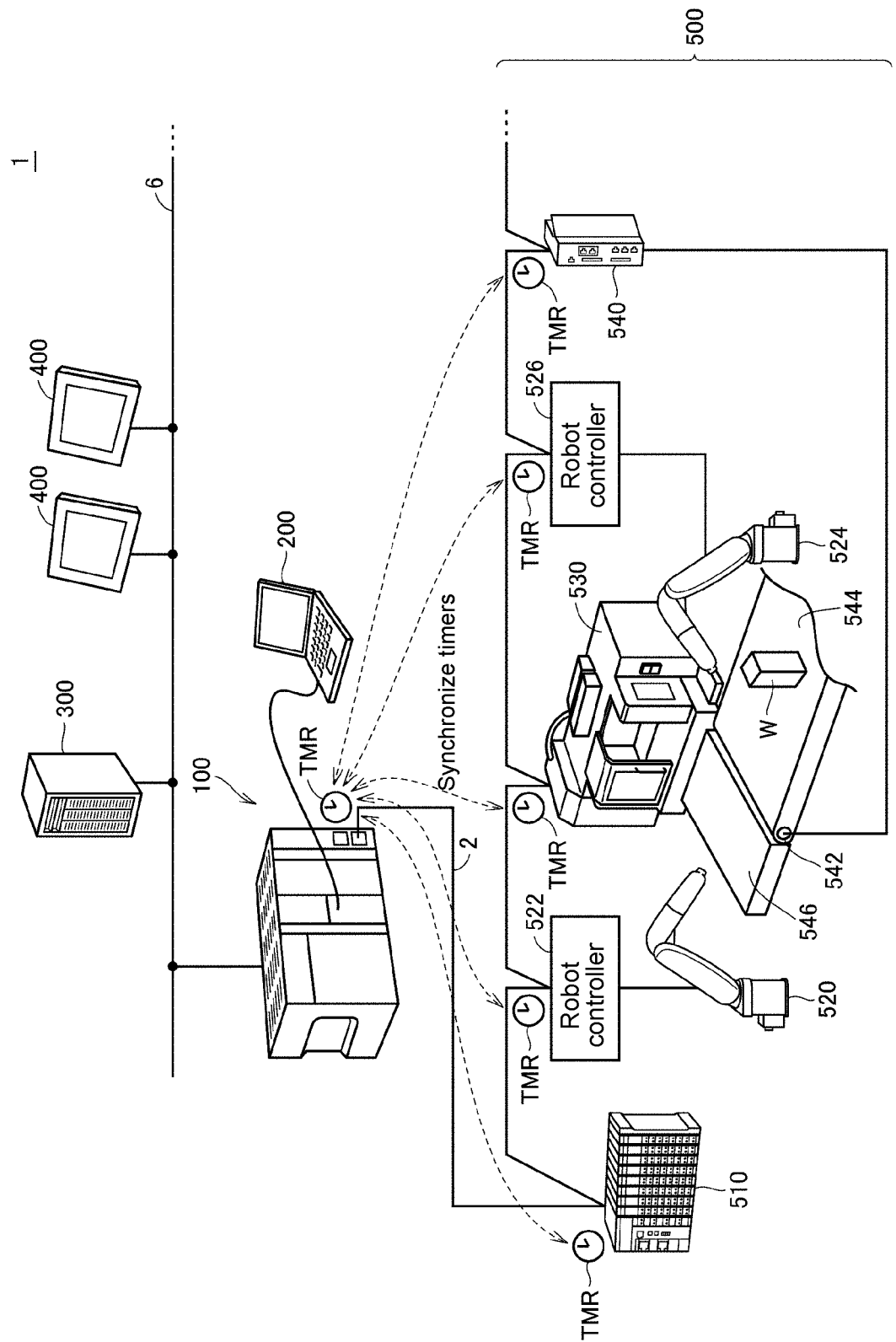
FIG. 1 is a schematic diagram showing an example of the overall configuration of the control system according to the embodiment.

According to the disclosure, since the first control device adjusts the output timing of the second control command based on the timing notified from the second control device, it is possible to link the operation of the control application controlled by the first control device and the operation of the control application controlled by the second control device.

In the above disclosure, the arbitration part determines the output timing of the second control command based on the timing notified from the second control device and a value indicated by the timer of the first control device.

According to the disclosure, because of use of the values indicated by the timers that are synchronized with each other in time, the cooperative operation can be realized with high accuracy.

In the above disclosure, the timing notified from the second control device is based on a value managed by the timer of the second control device.

According to the disclosure, highly accurate timing adjustment can be realized by specifying the timing using the values indicated by the timers.

In the above disclosure, the arbitration part instructs the parsing part to generate the second control command before the output timing of the second control command comes.

According to the disclosure, it is possible to output the second control command simultaneously with the timing notified from the second control device, and further, in some cases, it is possible to output the second control command before the timing notified from the second control device.

In the above disclosure, when determining that the second control command is not generated in time to meet the output timing of the second control command, the arbitration part raises a priority of a task related to generation of the second control command.

According to the disclosure, it is possible to ensure at least outputting the second control command at the timing notified from the second control device.

In the above disclosure, the arbitration part adjusts the output timing so that output of the second control command is started simultaneously with the timing notified from the second control device.

According to the disclosure, it is possible to synchronously operate the control application controlled by the first control device and the control application controlled by the second control device.

In the above disclosure, the arbitration part adjusts the output timing so that output of the second control command is started at a timing deviated from the timing notified from the second control device by a predetermined time.

According to the disclosure, it is possible to realize the cooperative operation between the control application controlled by the first control device and the control application controlled by the second control device with a certain time deviation.

According to the disclosure, since the output timing of the second control command is adjusted based on the timing notified from an external device, it is possible to link the operation of the control application controlled by the control device and the operation of the control application controlled by the external device.

According to the disclosure, a configuration is provided, which makes it possible to link with a CNC machine tool or robot even in a control system that combines a control device with another control device.

Embodiments of the disclosure are described in detail hereinafter with reference to the figures. In the figures, identical or corresponding parts are denoted by the same reference numerals and descriptions thereof will not be repeated.

A. EXAMPLE OF APPLICATION

First, an example of the situation, to which the disclosure is applied, is described with reference to FIG. 1 and FIG. 2.

FIG. 1 is a schematic diagram showing an example of the overall configuration of a control system 1 according to the embodiment. FIG. 1 shows the control system 1 centered on a control device 100 according to the embodiment.

Referring to FIG. 1, the control device 100 corresponds to an industrial controller that controls control objects, such as various equipment and devices. The control device 100 is a type of computer that executes a control operation which will be described later, and typically the control device 100 may be embodied as a PLC (programmable logic controller). The control device 100 may be connected to various field instruments 500 via a field network 2. The control device 100 exchanges data with one or more field instruments 500 via the field network 2 or the like. Generally, the "field network" is also referred to as a "field bus", but for simplicity, it is collectively referred to as "field network" in the following descriptions. That is to say, the "field network" in this specification is a concept that may cover the "field bus" in addition to the "field network" in a narrow sense.

A bus or network that performs periodic communication, by which data arrival time is guaranteed, may serve as the field network 2. The bus or network that performs periodic communication may be EtherCAT (registered trademark), EtherNet/IP (registered trademark), DeviceNet (registered trademark), CompoNet (registered trademark), etc.

Any field instruments 500 can be connected to the field network 2. The field instruments 500 include an actuator that applies a certain physical action to a manufacturing device or production line (or collectively referred to as a "field" hereinafter), and an input/output device that exchanges information with the field.

In the case of using EtherCAT (registered trademark) as the field network 2, at least one of the nodes connected to the field network 2 functions as a "master" while the other nodes function as "slaves". The node that functions as the "master" manages a frame transfer timing, etc. in the field network 2.

In the example shown in FIG. 1, the control device 100 functions as the "master" and the other field instruments 500 function as the "slaves". In the field network 2 that adopts the master-slave type configuration, timers TMRs synchronized with one another in time are provided between the nodes, and the frame transfer timing, etc. is determined based on the time (in practice, the counter value) indicated by the timer TMR of each node.

In the configuration shown in FIG. 1, the field instruments 500 connected to the field network 2 include a remote I/O (input/output) device 510, robot controllers 522 and 526, a CNC machine tool 530, and a servo driver 540.

As will be described later, the CNC machine tool 530 has a mechanism for generating a control command on its own and operates based on data received via the field network 2. That is, the CNC machine tool 530 incorporates a type of control device therein and executes processing according to the control command outputted from the control device.

Further, the robot controllers 522 and 526 and the servo driver 540 correspond to one or more actuators that operate according to the control command from the control device 100. The control command for the servo driver 540 is generated according to a motion instruction that is included in a sequence program cyclically executed in the control device 100. On the other hand, the control command for the robot controllers 522 and 526 is realized by an application program that is sequentially executed and a control command calculation process that is cyclically executed in the control device 100.

The control device 100 according to the embodiment has a program execution part (for example, a sequence program execution part 152 (details will be described later)) which executes the sequence program at every control cycle (first cycle) and outputs the control command.

In this specification, the sequence program is a concept that covers a program that can be scanned as a whole in each execution to output a control command in each execution. The sequence program includes a program composed of one or more instructions that are described according to the international standard IEC61131-3 defined by the International Electrotechnical Commission (IEC). The sequence program may include a sequence instruction and/or a motion instruction. Nevertheless, the sequence program is not limited to the instructions described in accordance with the international standard IEC61131-3, and may include an instruction that is defined independently by the manufacturer or vendor of the PLC (programmable logic controller). Thus, the sequence program is suitable for control that requires immediacy and high speed.

Basically, the sequence program is created by the user at will according to the control object or the application.

In this specification, the "sequence instruction" is a term that covers one or more instructions described by one or more logic circuits for calculating input values, output values, internal values, etc. In one control cycle, the "sequence instruction" is executed from the beginning to the end, and in the next control cycle, the "sequence instruction" is executed from the beginning to the end again.

In this specification, the "motion instruction" is a term that covers one or more instructions for calculating numerical values, such as position, speed, acceleration, jerk, angle, angular speed, angular acceleration, angular jerk, etc., as control commands for an actuator, such as a servo motor. The "motion instruction" is also executed from the beginning to the end of the program (motion program) of the motion instruction, as described by a function block or a numerical expression, in one control cycle.

The control command that is outputted by executing the sequence program at every control cycle typically includes on/off of the digital output determined according to the sequence instruction, and an analog output calculated according to the motion instruction.

Moreover, the control device 100 according to the embodiment has a parsing part (for example, an application program parsing part 160 (details will be described later)) which parses at least a part of one or more application programs at every application execution cycle (second cycle), which is equal to or longer than the control cycle (first cycle), to sequentially generate an internal command.

In this specification, the "application program" includes any program that is executed sequentially. Typically, the "application program" includes a program that is described in any language executable in an interpreter system, which sequentially executes the program line by line. In the following descriptions, a program that describes the behavior in CNC (computer numerical control) (or referred to as a "NC program" hereinafter) is given as an example of the "application program". Moreover, a program for controlling a robot is given as another example of the "application program".

The NC program is described according to a predetermined language. As an example, the NC program is described using "G language", and the program for controlling a robot is usually described using a dedicated robot language.

In the following descriptions, for example, including the device or machine, including the control thereof, that performs a particular process or operation using CNC (computer numerical control) and/or a robot may be referred to as a "control application".

In this specification, the "internal command" includes a command, different from the application program, for realizing a process corresponding to the command described in the application program. The "internal command" may be any command if the control command can be calculated at every control cycle. Since the application program as described above is executed sequentially, it is inherently not suitable for processing of outputting the control command at a regular cycle. Therefore, an internal command suitable for output of the control command at every control cycle is generated.

Typically, the "internal command" may be one or more functions with time as an input variable, or one or more commands with time as an argument.

In addition, the control device 100 according to the embodiment has a command calculation part (for example, a control command calculation part 164 (details will be described later)) which outputs control commands for at least a part of the robot controllers 522 and 526 and the servo driver 540 (one or more actuators) at every control cycle (first cycle) according to the internal command generated by the parsing part. By adopting such a command calculation part, it is possible to output the control command according to the application program at the same cycle as the output cycle of the control command calculated by execution of the sequence program.

The control device 100 and these field instruments 500 have timers TMR that are synchronized with each other in time. Therefore, the nodes connected to the field network 2 can share operation timing, etc. For example, by adjusting the timing of outputting the control command from the control device 100 to match the operation of the CNC machine tool 530, the cooperative operation between the CNC machine tool 530 and the robots 520 and 524 and/or the cooperative operation between the CNC machine tool 530 and the conveyor 544 can be realized easily.

In the control system 1 according to the embodiment, a configuration is provided, which makes it possible to easily realize the cooperation between a movable machine controlled by the application program executed by a built-in control device, such as the CNC machine tool 530, and a movable machine controlled by the control command from the control device 100.

Figure 2:
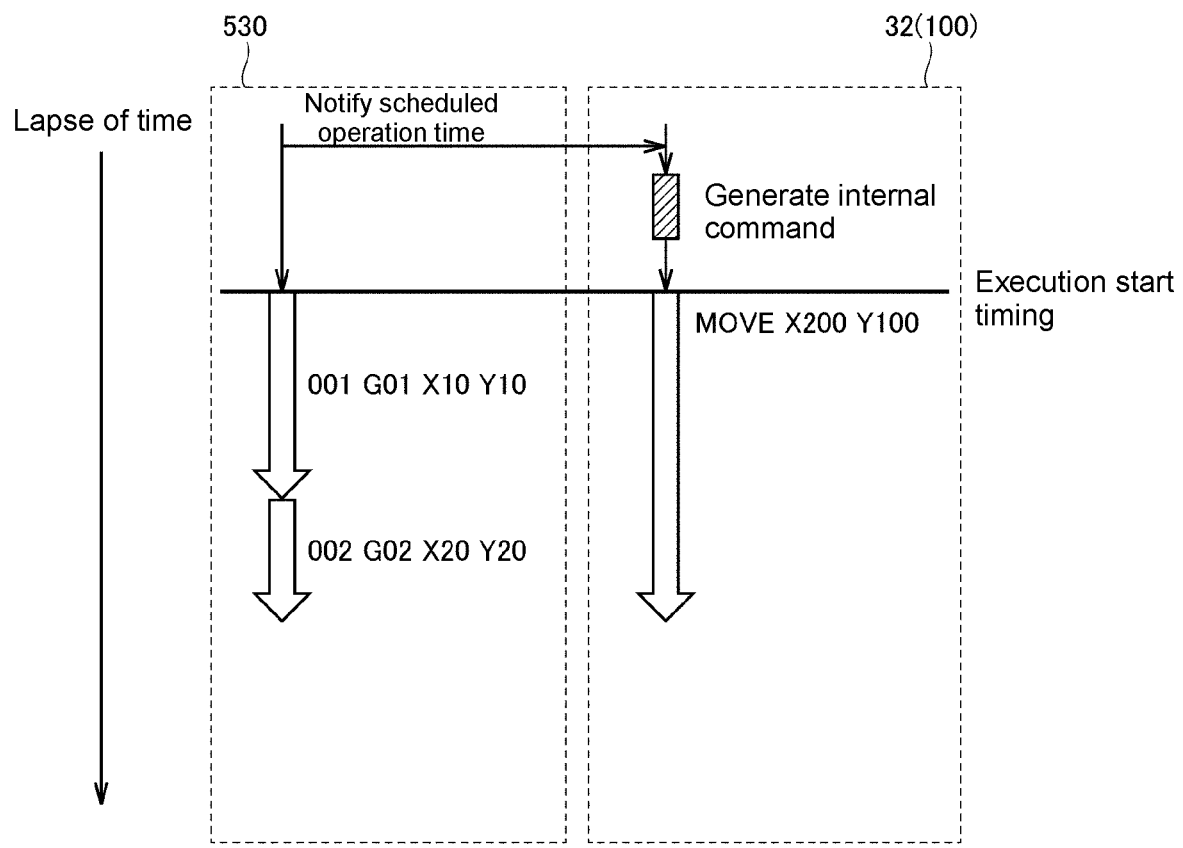
FIG. 2 is a time chart for illustrating the outline of processing in the control system according to the embodiment.

FIG. 2 is a time chart for illustrating the outline of the processing in the control system 1 according to the embodiment. FIG. 2 shows an example of processing in the case where the CNC machine tool 530 and the robot 520 are cooperatively operated.

It is assumed that a control command for operating the robot 520 is generated according to an application program 32 that is executed in the control device 100. That is, FIG. 2 shows a robot program as an example of the application program 32.

Referring to FIG. 2, it is assumed that the operations of the CNC machine tool 530 and the robot 520 are started with any execution start timing as a reference. In realizing such a cooperative operation, the CNC machine tool 530 notifies the control device 100 of a time (scheduled operation time) scheduled to start the operation before the execution start timing comes. The scheduled operation time is typically specified using the time (counter value) indicated by the timers TMR that are synchronized in time.

When receiving the notification of the scheduled operation time, the control device 100 parses a target command in the application program to generate an internal command. Then, when the execution start timing that has been notified in advance comes, the CNC machine tool 530 starts a predetermined operation, and the control device 100 starts to output a control command according to the pre-generated internal command. By giving the control command to the robot controller 522, the robot 520 can start to operate at the same timing as the execution start timing of the CNC machine tool 530.

Thus, the control device of the CNC machine tool 530 has a program execution part (for example, an application program execution part 584 (details will be described later)) which sequentially parses the application program to output the control command for the target movable machine, and a timing management part (for example, a processing timing management part 590 (details will be described later)) which notifies the control device 100 of the execution start timing for outputting the control command in advance. An arbitration part (for example, an application arbitration part 162 (details will be described later)) of the control device 100 adjusts the output period of the control command according to the internal command generated by the parsing part in response to the notification of the execution start timing from the control device of the CNC machine tool 530.

By the exchange between the control device 100 and the CNC machine tool 530 as shown in FIG. 2, the robot 520 controlled by the control device 100 and the CNC machine tool 530 controlled by the built-in control device can be operated in cooperation with each other. That is, with the control system 1 according to the embodiment, it is possible to realize the cooperative operation not only between the actuators operated by the control command from the control device 100, but also between the control applications operated by the control device that is independent of the control device 100.

For convenience, FIG. 2 shows an example that the CNC machine tool 530 and the robot 520 start to operate simultaneously with the execution start timing as a reference. However, the disclosure is not limited thereto, and one or both of the CNC machine tool 530 and the robot 520 may have some offset time with the execution start timing as a reference. For example, one device may start to operate at the execution start timing while the other device may be delayed by some offset time after the execution start timing to start the operation. By setting such an offset time, the cooperative operation can be realized with a certain delay time between the devices.

FIG. 1 shows an example that one or more actuators that operate according to the control command from the control device 100 are also connected to the field network 2. However, the disclosure is not limited thereto. Any connection form may be used if it can receive the control command from the control device 100. For example, the control command may be given from the remote I/O device 510 connected to the field network 2 via a signal line. In the control system 1 according to the embodiment, the timing at which the control command outputted from the control device 100 is given to the field instrument 500 under control and the timing at which the corresponding control command is given to the device that serves as the target of the cooperative operation only need to be substantially the same, and it is not required to have the same transmission form for the control commands.

For convenience, FIG. 2 shows an example that the notification of the execution start timing is sent from the CNC machine tool 530 to the control device 100. However, the disclosure is not limited thereto, and the notification of the execution start timing may be sent from the control device 100 to the CNC machine tool 530. In addition, notification of a common execution start timing may be sent to the control device 100 and the CNC machine tool 530 from some execution subject. In either case, when the execution start timing comes, the required processing is executed in advance so that the control command can be outputted.

Hereinafter, a more detailed configuration and processing of the control system 1 according to the embodiment are described as a more specific example of application of the disclosure.

<B. EXAMPLE OF OVERALL CONFIGURATION OF CONTROL SYSTEM>

First, an example of the overall configuration of the control system 1 shown in FIG. 1 will be described in detail.

In the configuration example shown in FIG. 1, the servo driver 540 drives a servo motor 542 according to the control command (for example, position instruction or speed instruction) from the control device 100. The servo motor 542 drives the conveyor 544 to convey a workpiece W to a worktable 546 disposed in front of the CNC machine tool 530.

The CNC machine tool 530 machines any object by controlling a machining center, etc. according to the program that specifies the position, speed, etc. Typically, the CNC machine tool 530 includes machining devices for lathe machining, milling machine, electric discharge machining, etc.

The robot controller 522 drives the robot 520, and the robot controller 526 drives the robot 524. The robot controllers 522 and 526 perform trajectory calculation and angle calculation of each axis according to the control command (position command or speed command) from the control device 100, and drive the servo motors, etc. that constitute the robots 520 and 524 according to the calculation results.

The robots 520 and 524 place the unprocessed workpiece W on the worktable 546 into the CNC machine tool 530, or retrieve the processed workpiece W in the CNC machine tool 530 and place it on the worktable 546.

Typically, the remote I/O device 510 includes a communication coupler for communication via the field network 2, and an input/output part (or referred to as an "I/O part" hereinafter) for acquiring the input data and outputting the output data. A device that collects input data of an input relay or various sensors (for example, analog sensor, temperature sensor, vibration sensor, etc.) and a device that applies some action to the fields, such as an output relay, a contactor, a servo driver, and any other actuator, are connected to the remote I/O device 510.

However, the field instruments 500 are not limited to the aforementioned, and any device (for example, a visual sensor, etc.) for collecting the input data and any device (for example, an inverter device, etc.) for applying some action according to the output data can serve as the field instruments 500.

Data is exchanged between the control device 100 and the field instruments 500 via the field network 2, but the exchanged data is updated at a very short cycle of several hundreds of μsec order to several tens of msec order. Such data exchange includes a process of transmitting data collected or generated in the field instrument 500 (or referred to as "input data" hereinafter) to the control device 100, and a process of transmitting data such as the control command for the field instrument 500 (or referred to as "output data" hereinafter) from the control device 100. The process of updating such exchanged data corresponds to the aforementioned "input/output refresh process".

The control device 100 may be connected to another device via a host network 6. The host network 6 may be EtherNet (registered trademark) or EtherNet/IP (registered trademark) which is a general network protocol. More specifically, one or more server devices 300 and one or more display devices 400 may be connected to the host network 6.

It is assumed that a database system, a manufacturing execution system (MES), etc. serve as the server devices 300. The manufacturing execution system acquires information from manufacturing devices or equipment of the control object to monitor and manage the entire production, and can handle order information, quality information, shipping information, etc. Nevertheless, the disclosure is not limited thereto, and a device that provides an information-based service may be connected to the host network 6. It is assumed that the information-based service is a process for acquiring information from the manufacturing devices or equipment of the control object to perform macro or micro analysis. For example, data mining for extracting some characteristic trend included in the information from the manufacturing devices or equipment of the control object, or a machine learning tool for performing machine learning based on the information from the equipment or machine of the control object is assumed.

The display device 400 receives an operation from the user and outputs a command, etc. corresponding to the user operation to the control device 100, and graphically displays a calculation result, etc. in the control device 100.

Furthermore, a support device 200 can be connected to the control device 100. The support device 200 is a device that supports preparation required for the control device 100 to control the control object 100. Specifically, the support device 200 provides a development environment of the program to be executed by the control device 100 (program creation editing tool, parser, compiler, etc.), a setting environment for setting parameters (configurations) of the control device 100 and various devices connected to the control device 100, a function of outputting the created sequence program or application program to the control device 100, a function of modifying/changing online the sequence program to be executed on the control device 100, etc.

C. EXAMPLE OF HARDWARE CONFIGURATION OF CONTROL DEVICE

Figure 3:
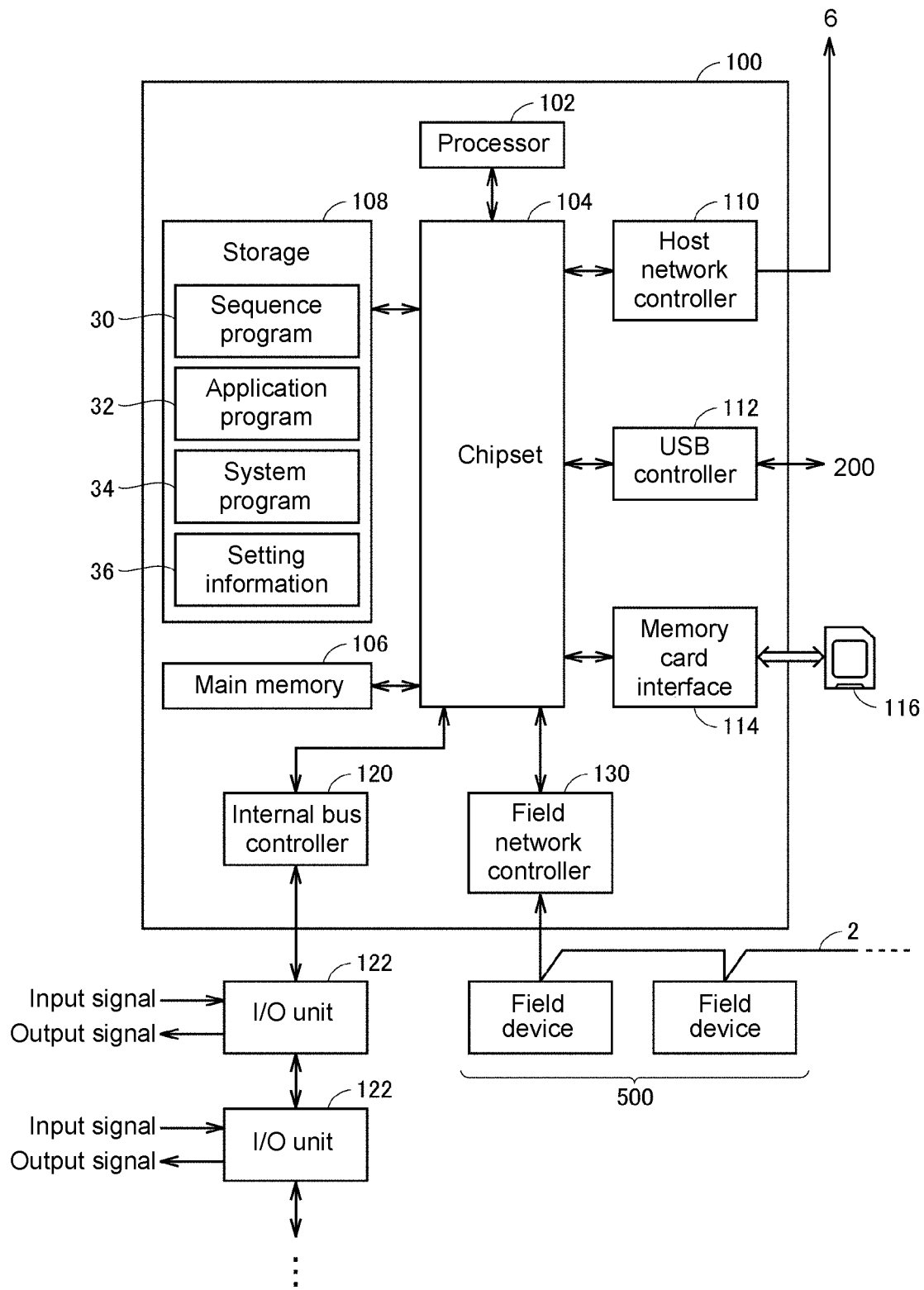
FIG. 3 is a block diagram showing an example of the hardware configuration of the control device according to the embodiment.

Next, an example of the hardware configuration of the control device 100 according to the embodiment will be described. FIG. 3 is a block diagram showing an example of the hardware configuration of the control device 100 according to the embodiment.

Referring to FIG. 3, the control device 100 is an arithmetic processing part called a CPU unit, and includes a processor 102, a chipset 104, a main memory 106, a storage 108, a host network controller 110, a USB (universal serial bus) controller 112, a memory card interface 114, an internal bus controller 120, and a field network controller 130.

The processor 102 comprises a CPU (central processing unit), an MPU (micro processing unit), a GPU (graphics processing unit), etc. A configuration having a plurality of cores may be adopted to serve as the processor 102, and a plurality of processors 102 may be disposed. That is, the control device 100 has one or more processors 102 and/or the processor 102 having one or more cores. The chipset 104 realizes the processing of the entire control device 100 by controlling the processor 102 and the peripheral elements. The main memory 106 comprises a volatile storage device, such as DRAM (dynamic random access memory) or SRAM (static random access memory). The storage 108 comprises for example a non-volatile storage device, such as HDD (hard disk drive) or SSD (solid state drive).

The processor 102 reads various programs stored in the storage 108 and develops them in the main memory 106 to execute them, thereby realizing control corresponding to the control object and various processes which will be described later. In addition to a system program 34 for realizing the basic function, a sequence program 30 and an application program 32 created corresponding to the manufacturing device or equipment of the control object are stored in the storage 108.

The host network controller 110 controls exchange of data with the server device 300, the display device 400 (see FIG. 1), etc. via the host network 6. The USB controller 112 controls exchange of data with the support device 200 via USB connection.

The memory card interface 114 is configured to allow the memory card 116 to be attached thereto or detached therefrom, and is capable of writing data to the memory card 116 and reading various data (the sequence program 30, the application program 32, trace data, etc.) from the memory card 116.

The internal bus controller 120 controls the exchange of data with I/O parts 122 that are attached to the control device 100. The field network controller 130 controls the exchange of data with field devices via the field network 2.

FIG. 3 shows a configuration example that the required functions are provided by execution of the programs performed by the processor 102. However, a part or all of the provided functions may also be implemented by using a dedicated hardware circuit (for example, ASIC or FPGA). Alternatively, the main parts of the control device 100 may be realized by using hardware according to a general-purpose architecture (for example, an industrial personal computer based on a general-purpose personal computer). In this case, a plurality of OSs (operating systems) for different uses may be executed in parallel by using a virtualization technique, and the required applications may be executed on the respective OSs.

In the control system 1 shown in FIG. 3, the control device 100, the support device 200, and the display device 400 are configured separately. However, it is also possible to adopt a configuration that all or a part of these functions are integrated in one single device.

D. EXAMPLE OF FUNCTIONAL CONFIGURATION OF CONTROL DEVICE

Figure 4:
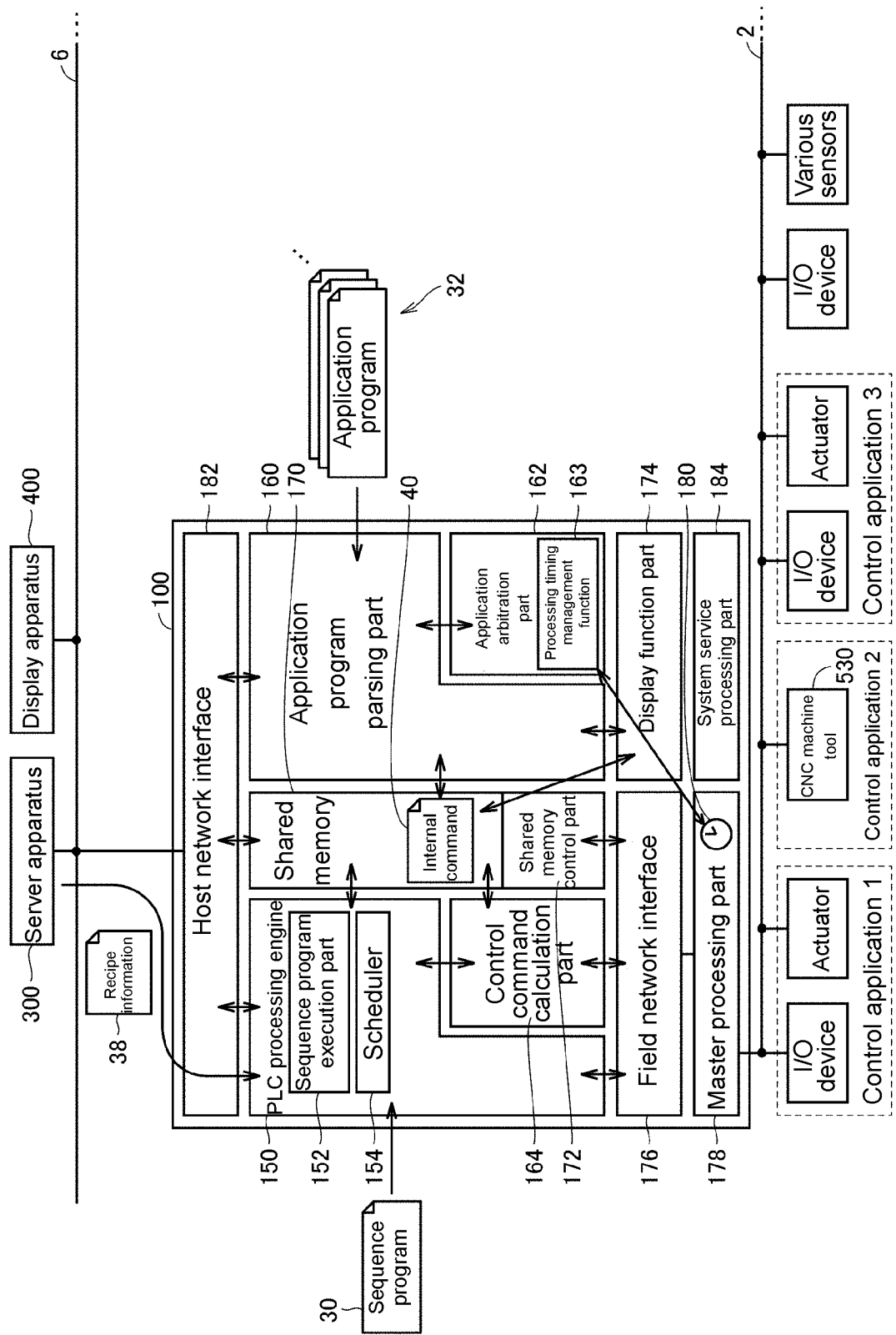
FIG. 4 is a block diagram showing an example of the functional configuration of the control device according to the embodiment.

Next, an example of the functional configuration of the control device 100 according to the embodiment will be described. FIG. 4 is a block diagram showing an example of the functional configuration of the control device 100 according to the embodiment.

FIG. 4 shows a configuration example that the control device 100 controls a control application 1 and a control application 2. Typically, each of the control application 1 and the control application 2 includes I/O devices, such as a relay and a contactor, and various actuators, such as a servo motor. In addition to the control application 1 and the control application 2, other I/O devices and various sensors are also connected to the control device 100 via the field network 2.

The control device 100 receives instructions of start/end of production from the server device 300, etc. connected via the host network 6. The server device 300 may also transmit recipe information 38 (information of the product type or parameters suitable for production) to the control device 100. The control device 100 may also be connected to another control device 100 (not shown) via a network.

Referring to FIG. 4, the control device 100 (first control device) includes a PLC processing engine 150, an application program parsing part 160, an application arbitration part 162, a control command calculation part 164, a shared memory 170, a shared memory control part 172, a display function part 174, a field network interface 176, a master processing part 178, an internal counter 180, a host network interface 182, and a system service processing part 184.

The PLC processing engine 150 manages the execution of the sequence program 30 and the processing of the entire control device 100. More specifically, the PLC processing engine 150 includes a sequence program execution part 152 and a scheduler 154.

The sequence program execution part 152 executes (scans) the sequence program 30 at every control cycle T1 to output a control command.

The scheduler 154 mediates the order of the processes to be executed in the control device 100, and more specifically, allocates the processor resource to one or more tasks based on the preset priorities.

The application program parsing part 160 parses at least a part of the application program 32 at every application execution cycle T2, which is equal to or longer than the control cycle T1, to sequentially generate the internal command 40. Different types of application programs 32 may be provided to the application program parsing part 160. The application program parsing part 160 may execute a pre-stored application program 32, or may execute an application program 32 appropriately transmitted from the server device 300.

The control command calculation part 164 calculates a control command at every control cycle T1 according to the motion instruction included in the sequence program 30. In addition, the control command calculation part 164 calculates a control command at every control cycle T1 according to the internal command 40 generated by the application program parsing part 160. These control commands are directed to at least a part of the robot controllers 522 and 526 and the servo driver 540.

The sequence program execution part 152 and the control command calculation part 164 execute processing at every control cycle T1 (high priority task). On the other hand, the processing for the application program 32 performed by the application program parsing part 160 is executed at every application execution cycle T2 (second cycle) which is an integral multiple of the control cycle T1 (low priority task).

The application arbitration part 162 manages the parsing process performed by the application program parsing part 160. In response to the notification of the scheduled operation time (execution start timing) from the outside, the application arbitration part 162 adjusts the output timing of the control command according to the internal command generated by the application program 32 in the application program parsing part 160.

More specifically, the application arbitration part 162 has a processing timing management function 163. The processing timing management function 163 adjusts the output timing so that the output of the control command according to the application program 32 is started at the same time as the scheduled operation time (execution start timing) notified from the outside. The processing timing management function 163 determines the output timing based on the counter value, etc. indicated by the internal counter 180 of the master processing part 178.

At this time, the application arbitration part 162 manages and changes the start timing, priority, etc. of the parsing process in the application program parsing part 160.

The shared memory 170 holds data that is to be shared among the PLC processing engine 150, the application program parsing part 160, and the control command calculation part 164. The shared data may be stored as a structure variable. For example, the internal command 40 generated sequentially by the application program parsing part 160 is sequentially written to the structure variable of the shared memory 170.

The shared memory control part 172 performs exclusive control of writing and reading data to and from the shared memory 170 and access to the shared memory 170 corresponding to an external request. For example, the shared memory control part 172 gives the data on the shared memory 170 to the field network interface 176, so as to transmit it to any field instrument 500 connected via the field network 2.

The display function part 174 outputs the data stored in the shared memory 170 and the processing result from the application program parsing part 160 to a user, etc.

The field network interface 176 mediates the exchange of data with the field instrument 500 that is connected via the field network 2.

The master processing part 178 performs management, etc. of the frame transfer timing in the field network 2. The master processing part 178 has the internal counter 180. The internal counter 180 may be used as a master clock that is referred to by nodes connected to the field network 2. That is, the value of the counter held by each node connected to the field network 2 is aligned based on the counter value of the internal counter 180.

The host network interface 182 mediates the exchange of data with the device that is connected via the host network 6.

The system service processing part 184 is in charge of data transmission to one or more server devices 300, etc. via the host network interface 182. Typically, the system service processing part 184 exchanges data with the outside in a period when none of the PLC processing engine 150 and the application program parsing part 160 is executing task processing.

E. AN EXAMPLE OF INTERNAL COMMAND

Next, an example of the internal command 40 generated by parsing the application program 32 performed by the application program parsing part 160 of the control device 100 will be described. Any program described in any language that is executable in an interpreter system can be adopted as the application program 32. However, in the following descriptions, it is assumed to be a program defining a trajectory of one or more commands in advance, like an NC program or a robot program.

Figure 5A:
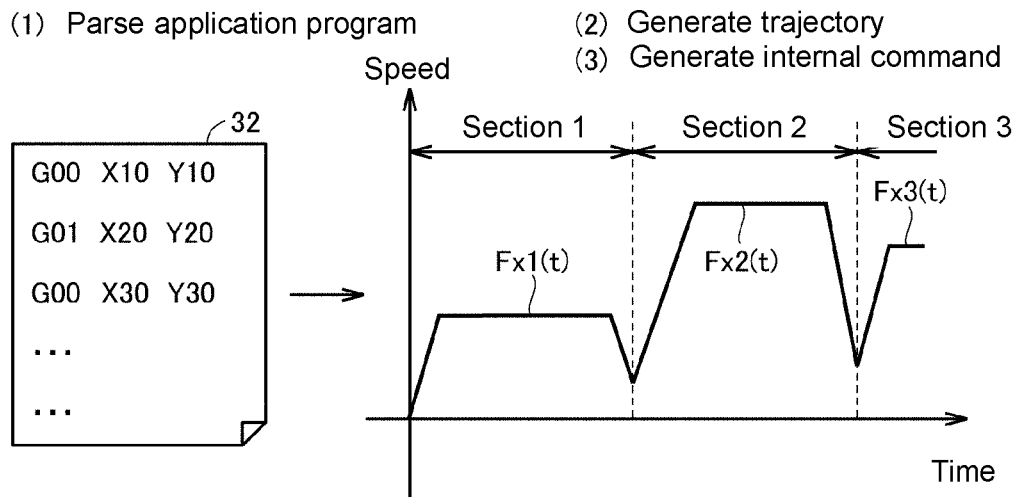
FIG. 5A and FIG. 5B are schematic diagrams for illustrating the generation process of an internal command in the control device according to the embodiment.
Figure 5B:
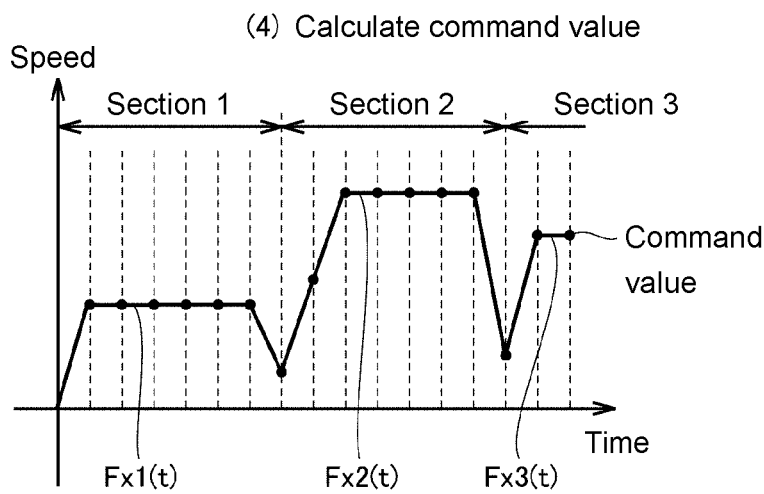

FIG. 5A and FIG. 5B are schematic diagrams for illustrating the generation process of the internal command 40 in the control device 100 according to the embodiment. Referring to FIG. 5A, the application program parsing part 160 parses the application program 32, and each instruction included in the application program 32 is parsed ((1) parse application program). By parsing the application program 32, the defined trajectory is generated internally ((2) generate trajectory). Since the application program 32 usually includes an instruction that defines a trajectory for each section, a trajectory is generated for each section corresponding to each instruction.

In the case of defining a group composed of a plurality of axes, a trajectory may be generated for each axis, or a trajectory defining the behavior of all the axes belonging to the group may be generated.

The application program parsing part 160 generates the internal command 40 (typically, one or more functions) that indicates the generated trajectory ((3) generate internal command). In the case where the trajectory is defined for each section, the internal command 40 is generated corresponding to each section.

As described above, the application program parsing part 160 parses the application program 32 to calculate a passing point on the trajectory, and generates the internal command based on the calculated passing point.

A plurality of sections may be defined by a common internal command 40, or one single section may be further divided to generate respective internal commands 40. In other words, the instruction of the application program 32 or the section of the trajectory defined by the instruction, and the number of the internal commands 40 generated do not necessarily match each other, and they may be generated arbitrarily. Moreover, the output form of the internal command 40 may be designed appropriately in consideration of the required time width, etc. of the control cycle T1.

As shown in FIG. 5A, the internal command 40 may be a function that defines the relationship between time and an instruction value, for example. In the example shown in FIG. 5A, the internally generated trajectory can be defined by a combination of straight lines. As an example, $Fx1(t)$, $Fx2(t)$, and $Fx3(t)$ can be outputted to indicate the relationship between time and speed of the trajectory of each straight section (section 1 to section 3) with respect to the X axis. For other axes (for example, Y axis and Z axis) belonging to the same group, functions may be outputted respectively in the same manner.

As shown in FIG. 5B, the control command calculation part 164 calculates the control command according to the generated internal command 40 at every control cycle T1, so that the control command is outputted at every control cycle T1 ((4) instruction value calculation). That is, by inputting the time of each control cycle to the function corresponding to each section, the instruction value at that time can be determined uniquely. In the case of setting any group, the instruction value may be synchronized and outputted with respect to each axis belonging to the group.

FIG. 5A and FIG. 5B show an example of the command that is described in the G language used in CNC. However, the disclosure is not limited thereto. If the program is executed by any interpreter system, any language may be used. In addition, the format of the generated internal command 40 may differ corresponding to the language format to be processed.

F. EXECUTION SCHEDULE OF TASK

Figure 6:
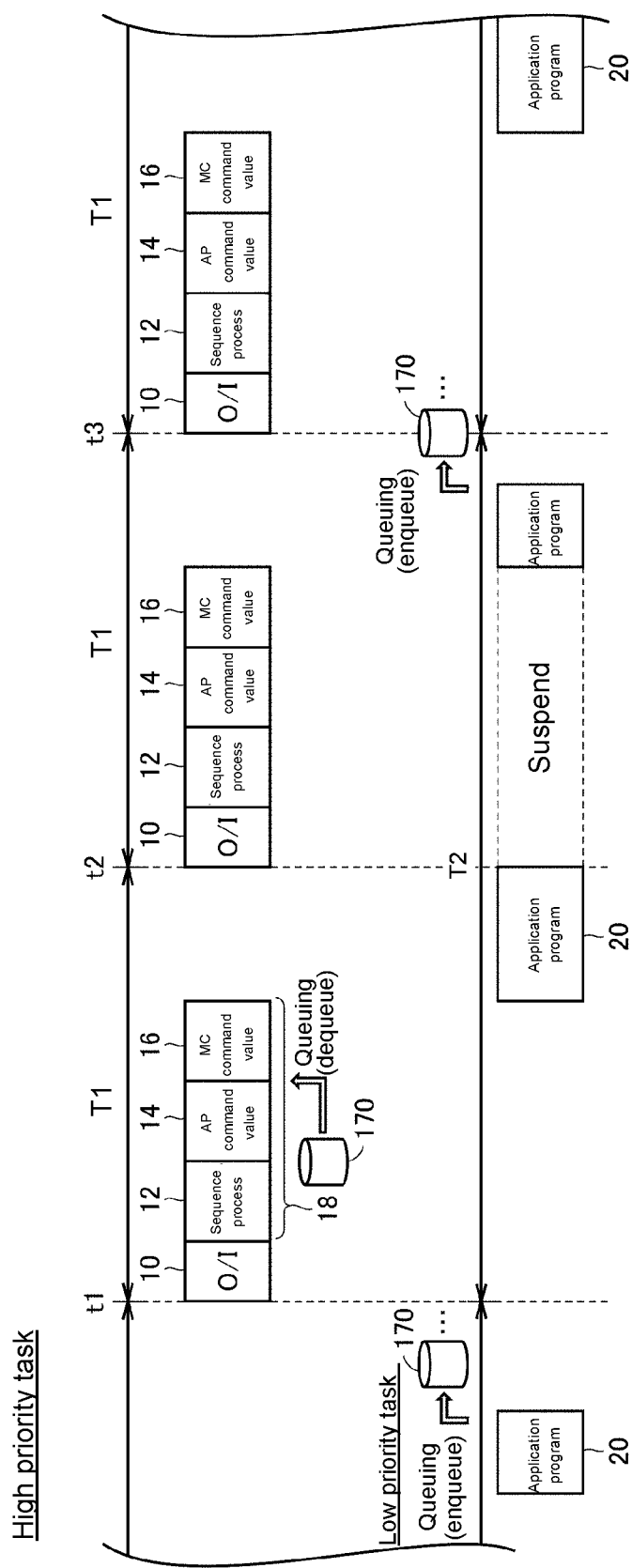
FIG. 6 is a time chart showing an example of the task execution schedule in the control device according to the embodiment.

Next, an execution schedule of each task in the control device 100 according to the embodiment will be described. FIG. 6 is a time chart showing an example of the task execution schedule in the control device 100 according to the embodiment.

Referring to FIG. 6, a first task 10 (input/output refresh process) and a second task 18 (including the sequence instruction execution process 12, the output process 14 of the control command according to the application program, and the output process 16 of the control command according to the motion instruction included in the sequence program 30) are set as high priority tasks. A third task 20 (the process of parsing the application program 32 to sequentially generate the internal command 40) is set as the low priority task.

The high priority task is executed at every control cycle T1. In the output process 14 of the control command according to the application program, the internal command 40 generated by the application program parsing part 160 is read (dequeued) from the shared memory 170, and the control command in the control cycle T1 is calculated.

The low priority task is executed at every application execution cycle T2. The application execution cycle T2 is set in the unit of an integral multiple of the control cycle T1 (twice in the example shown in FIG. 6). That is, the application program parsing part 160 parses at least a part of the application program 32 to sequentially generate the internal command 40 at every application execution cycle T2. The generated internal command 40 is sequentially queued (enqueued) to a buffer in the shared memory 170.

The process for the low priority task only needs to be completed within the application execution cycle T2. Since the processor resource is not allocated to the low priority task during the period when the high priority task is executed, the low priority task stands by in a suspended state.

The execution schedule of each task as shown in FIG. 6, that is, the allocation of the processor resource, is executed by the scheduler 154. The scheduler 154 allocates the processor resource for each task based on the priority set to each task.

For convenience, the application execution cycle T2 is twice the control cycle T1, for example. However, the disclosure is not limited thereto. The application execution cycle T2 can be set as an integral multiple of the control cycle T1 or as long as the control cycle T1 corresponding to the type of the target application program.

G. EXAMPLE OF HARDWARE CONFIGURATION OF CNC MACHINE TOOL

Figure 7:
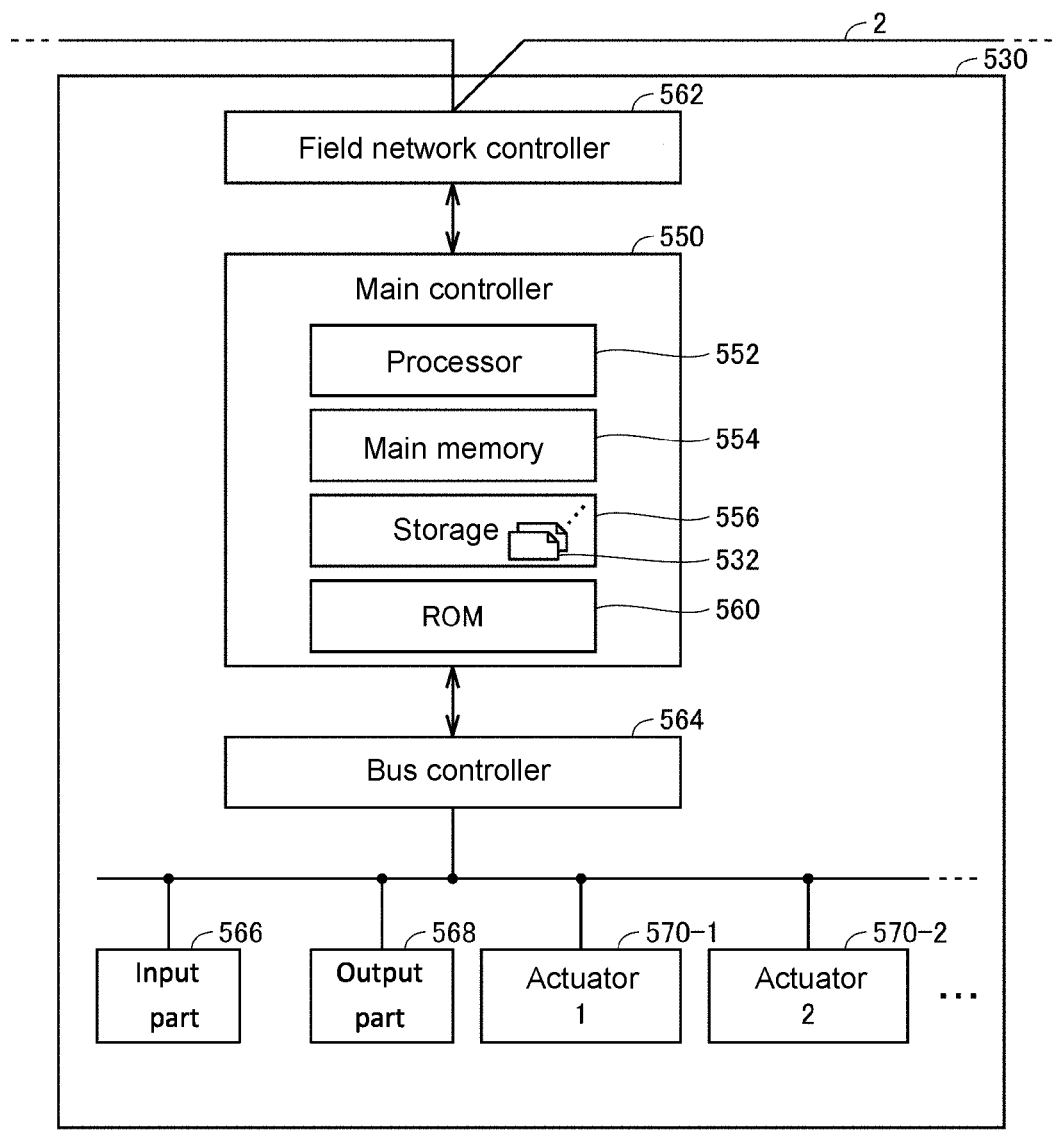
FIG. 7 is a block diagram showing an example of the hardware configuration of the CNC machine tool included in the control system according to the embodiment.

Next, an example of the hardware configuration of the CNC machine tool 530 included in the control system 1 according to the embodiment will be described. FIG. 7 is a block diagram showing an example of the hardware configuration of the CNC machine tool 530 included in the control system 1 according to the embodiment.

Referring to FIG. 7, the CNC machine tool 530 is an example of the control application and includes a movable machine to be given a control command. More specifically, the CNC machine tool 530 includes a main controller 550, a field network controller 562, a bus controller 564, an input part 566, an output part 568, and a plurality of actuators 570-1, 570-2, . . . .

The main controller 550 corresponds to another control device network-connected to the control device 100, and sequentially parses the application program 532 to sequentially output the control command. More specifically, the main controller 550 includes a processor 552, a main memory 554, a storage 556, and a ROM (read only memory) 560.

The processor 552 comprises a CPU, an MPU, a GPU, etc. The processor 552 may adopt a configuration that has a plurality of cores, and a plurality of the processors 552 may be disposed. The main memory 554 comprises a volatile storage device, such as DRAM or SRAM. The storage 556 comprises for example a non-volatile storage device, such as flash memory, HDD, or SSD. One or more application programs 532 are stored in the storage 556.

The ROM 560 stores a system program, etc. for implementing basic processing (for example, processing for parsing one or more application programs 532) in the processor 552.

The processor 552 reads the system program stored in the ROM 560 and one or more application programs 532 stored in the storage 556, expands them in the main memory 554, and sequentially parses them, so as to sequentially output the control command. In the main controller 550 of the CNC machine tool 530, the one or more application programs 532 are parsed directly for outputting the control command. Therefore, the aforementioned internal command may not be generated.

The field network controller 562 exchanges data with the control device 100, etc. via the field network 2.

The bus controller 564 exchanges data with the main controller 550, the input part 566, the output part 568, and the actuators 570-1, 570-2, . . . .

The input part 566 is a component that accepts user operations, such as operations of buttons and dials. A signal indicating the user operation made to the input part 566 is given to the main controller 550 via the bus controller 564.

The output part 568 is a component for notifying the user, such as an indicator lamp, a buzzer, etc. The output part 568 turns on the lamp, outputs a sound, etc. in response to the instruction from the main controller 550.

The actuators 570-1, 570-2, . . . are components for driving each movable part of the CNC machine tool 530 and include a servo driver, a servo motor, etc. The control command from the main controller 550 is given to the target actuator 570-1, 570-2, . . . via the bus controller 564.

H. EXAMPLE OF FUNCTIONAL CONFIGURATION OF CNC MACHINE TOOL

Figure 8:
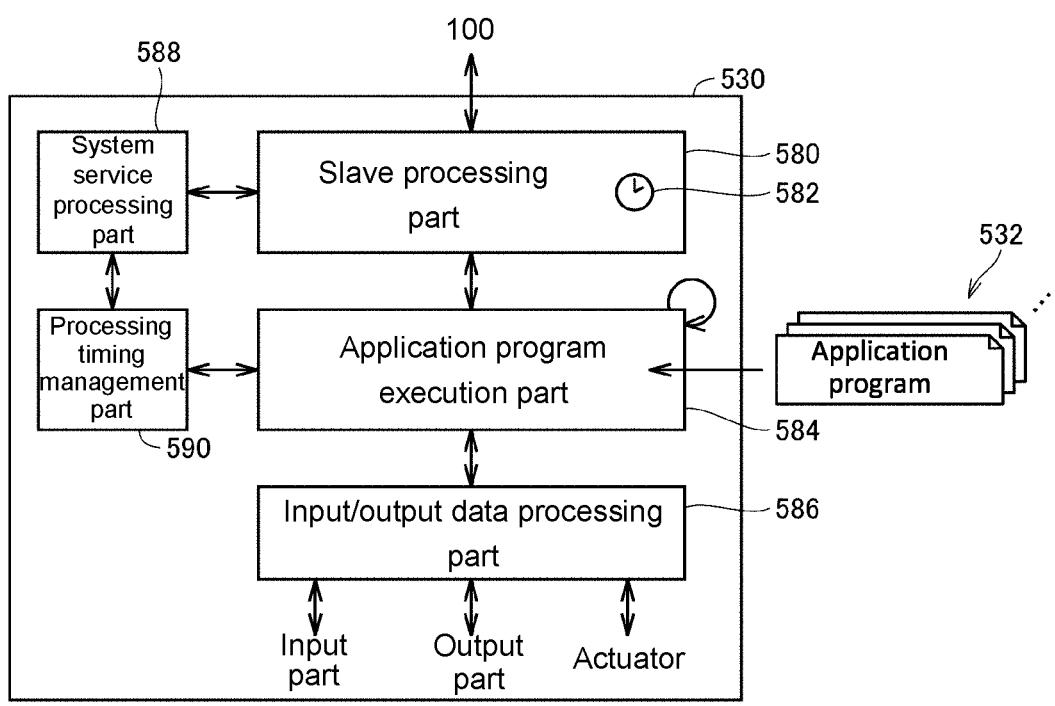
FIG. 8 is a block diagram showing an example of the functional configuration of the CNC machine tool included in the control system according to the embodiment.

Next, an example of the functional configuration of the CNC machine tool 530 included in the control system 1 according to the embodiment will be described. FIG. 8 is a block diagram showing an example of the functional configuration of the CNC machine tool 530 included in the control system 1 according to the embodiment.

Referring to FIG. 8, the CNC machine tool 530 includes a slave processing part 580, an internal counter 582, an application program execution part 584, an input/output data processing part 586, a system service processing part 588, and a processing timing management part 590.

The slave processing part 580 manages frame transmission and reception in the field network 2. The slave processing part 580 has the internal counter 582. The internal counter 582 is synchronized with the internal counter 180 of the control device 100, and the frame transfer is controlled based on the counter value indicated by the internal counter 180.

The application program execution part 584 sequentially parses one or more application programs 532 to output the control command for the target actuators 570-1, 570-2, . . . (corresponding to the movable machines).

The input/output data processing part 586 outputs the control command from the application program execution part 584 to the target actuators, etc. In addition, the input/output data processing part 586 outputs the input data from the input part to the application program execution part 584, and outputs the output data from the application program execution part 584 to the output part.

The system service processing part 588 manages incidental processing in the CNC machine tool 530.

The processing timing management part 590 is in charge of the notification process of the execution start timing shown in FIG. 1, etc., according to a predetermined condition, etc. That is, the processing timing management part 590 notifies the control device 100 of the timing of outputting the control command in the CNC machine tool 530 in advance. The timing notified by the processing timing management part 590 may be determined based on the execution state of the application program 532, etc. When receiving the notification of the execution start timing from the outside, the processing timing management part 590 controls the execution start timing of the application program 532 in the application program execution part 584 according to the predetermined condition, etc.

I. COOPERATIVE OPERATION USING NOTIFICATION OF SCHEDULED OPERATION TIME

Next, the cooperative operation that uses the notification of the scheduled operation time in the control system 1 according to the embodiment will be described.

(i1: Entire Sequence)

Figure 9:
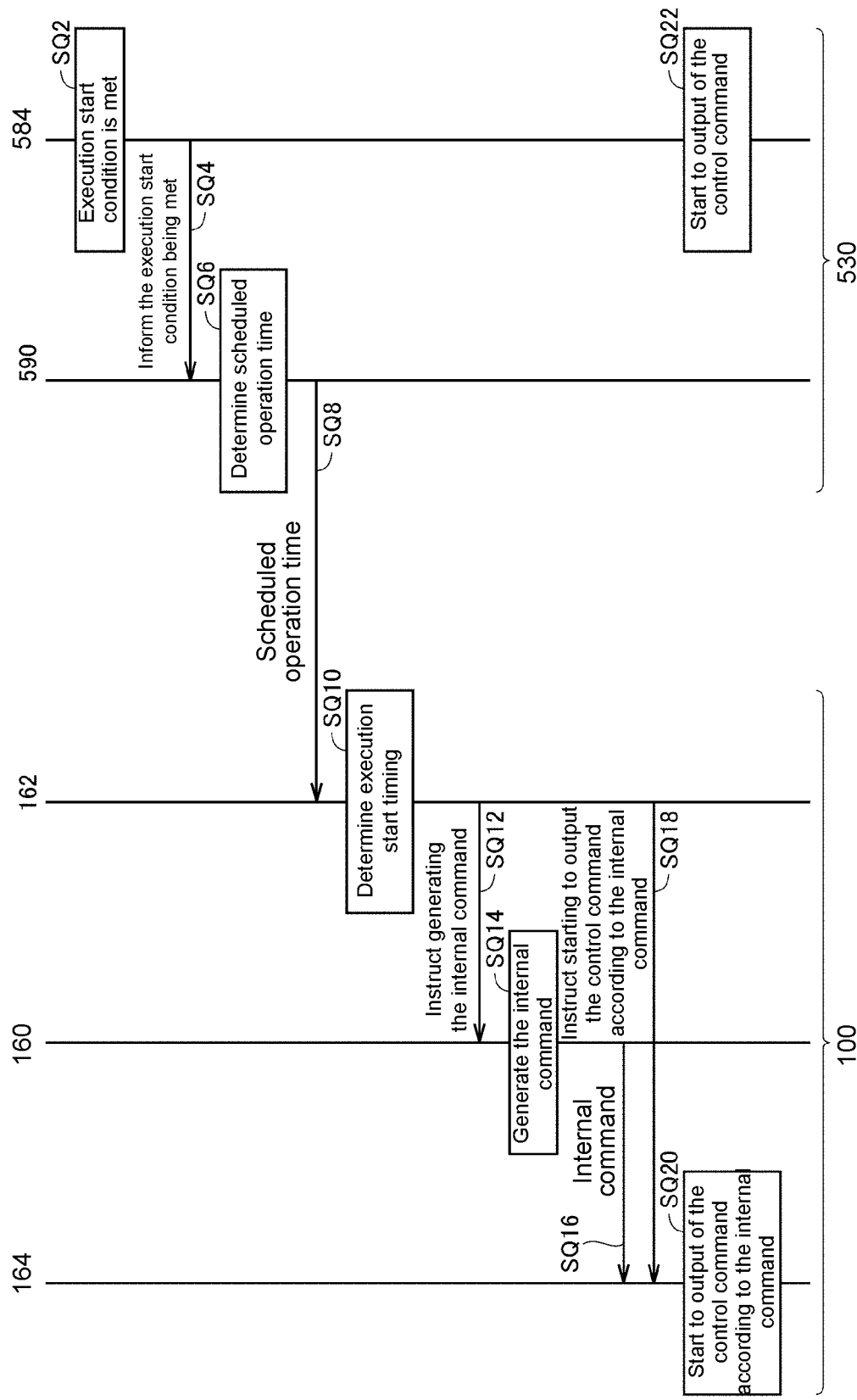
FIG. 9 is a sequence diagram related to the cooperative operation that uses notification of the scheduled operation time in the control system according to the embodiment.

First, an example of the entire sequence related to the cooperative operation that uses the notification of the scheduled operation time will be described. FIG. 9 is a sequence diagram related to the cooperative operation that uses the notification of the scheduled operation time in the control system 1 according to the embodiment.

As a typical example, FIG. 9 shows a process involving the control command calculation part 164, the application program parsing part 160, and the application arbitration part 162 of the control device 100, and the application program execution part 584 and the processing timing management part 590 of the CNC machine tool 530.

Referring to FIG. 9, in the application program execution part 584 of the CNC machine tool 530, when any execution start condition is met (sequence SQ2), the processing timing management part 590 is notified by the application program execution part 584 that the execution start condition is met (sequence SQ4). The execution start condition is a condition for starting execution of any application program 532 in the CNC machine tool 530.

When receiving the notification of the execution start condition being met, the processing timing management part 590 determines the scheduled time of starting the operation (scheduled operation time) based on the content of the execution start condition or a predetermined setting value, etc. (sequence SQ6). The application arbitration part 162 of the control device 100 is notified of the determined scheduled operation time (sequence SQ8).

The application arbitration part 162 of the control device 100 determines the execution start timing of the corresponding application program 32 based on the scheduled operation time from the CNC machine tool 530 (sequence SQ10). The execution start timing is typically determined based on the difference between the timing (scheduled operation time) notified from the CNC machine tool 530 and the current time (that is, the value indicated by the timer TMR) indicated by the counter value of the internal counter 180 that is managed by the control device 100.

The application arbitration part 162 instructs the application program parsing part 160 to generate a control command before the execution start timing comes. That is, the application arbitration part 162 instructs the application program parsing part 160 to generate an internal command (sequence SQ12). In response to the instruction, the application program parsing part 160 parses the target application program 532 to generate an internal command (sequence SQ14). The generated internal command is sequentially queued (enqueued) to the buffer in the shared memory 170 and access from the control command calculation part 164 becomes possible (sequence SQ16).

In addition, when the execution start timing determined in sequence SQ10 comes, the application arbitration part 162 instructs the application program parsing part 160 to start outputting the control command according to the generated internal command (sequence SQ18). Upon receiving the instruction to start outputting, the control command calculation part 164 starts outputting the control command according to the internal command (sequence SQ20).

Meanwhile, in the application program execution part 584 of the CNC machine tool 530, output of the control command according to the application program 532 is started (sequence SQ22).

By such a series of processes, the cooperative operation can be realized with reference to the scheduled operation time.

(i2: Example of Program)

Figure 10:
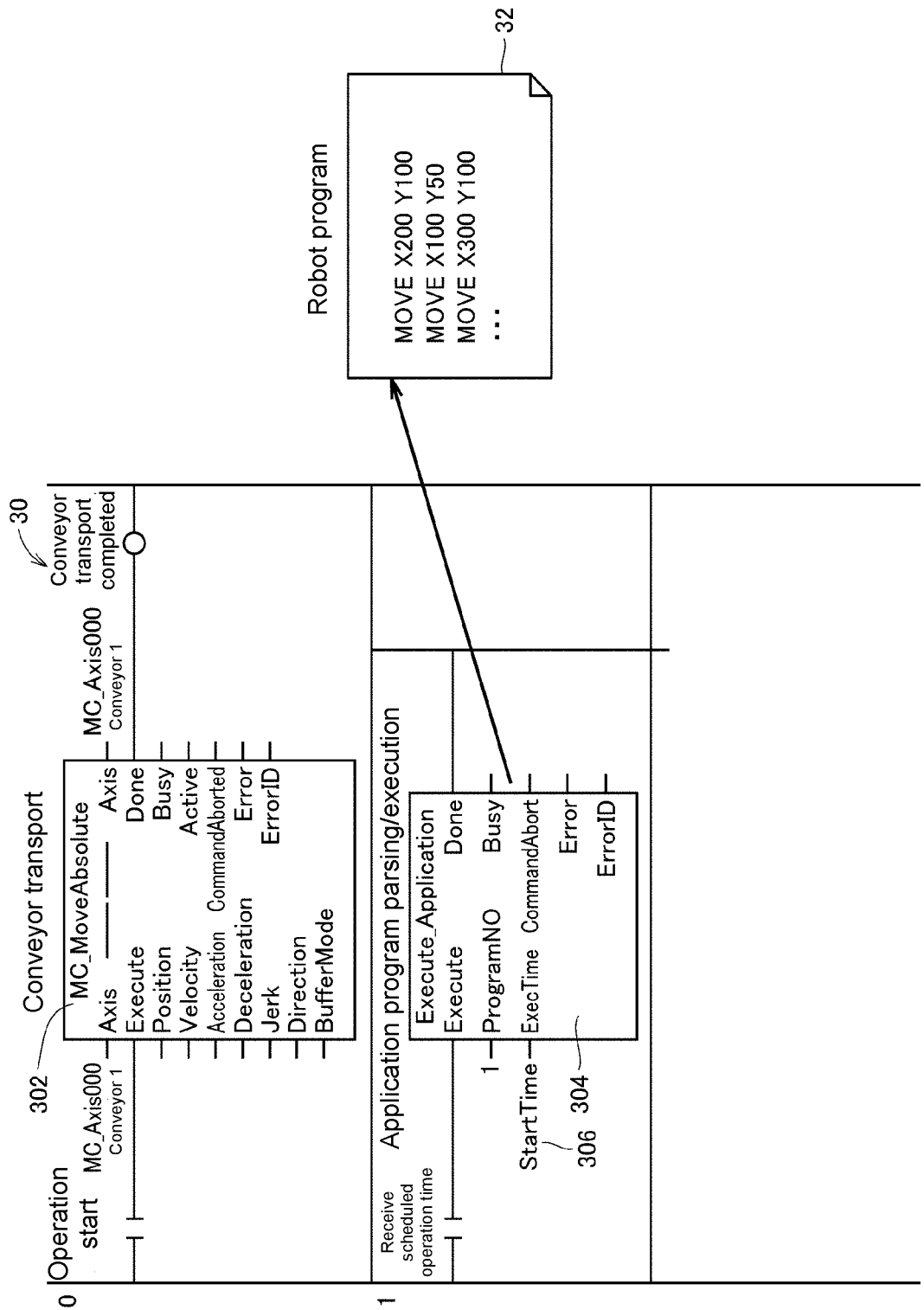
FIG. 10 is an example of the program for realizing the cooperative operation that uses notification of the scheduled operation time in the control system according to the embodiment.

Next, an example of the program for realizing the cooperative operation that uses the notification of the scheduled operation time will be described. FIG. 10 is an example of the program for realizing the cooperative operation that uses the notification of the scheduled operation time in the control system 1 according to the embodiment.

The sequence program 30 shown in FIG. 10 is directed to control of the conveyor 544 and the robot 520 (see FIG. 1). The CNC machine tool 530 is controlled by execution of the application program 532 performed by the built-in main controller 550.

The sequence program 30 includes a function block 302 that defines the motion instruction for controlling the servo motor 542 that drives the conveyor 544, and a function block 304 that instructs start of execution of the application program 32 (robot program) for controlling the CNC machine tool 530.

The function block 302 executes the specified process when the operation start flag becomes TRUE.

The function block 304 is activated on condition that the scheduled operation time is received from the CNC machine tool 530. For the function block 304, a variable StartTime, in which the received scheduled operation time is stored, is given as the value of ExecTime. The function block 304 is executed with the variable StartTime as input, by which the application arbitration part 162 determines the execution start timing, etc. Then, according to the determined execution start timing, the output of the control command according to the specified application program 32 is started.

As shown in FIG. 10, the user can realize the cooperative operation with the CNC machine tool 530 by simpler coding without noticing the notification of the scheduled operation time from the CNC machine tool 530, etc.

(i3: Change of Priority)

As described above with reference to FIG. 9, etc., in the control device 100, it needs to parse the application program 32 to generate internal command in advance, so that output of the control command can be started from the scheduled operation time that is notified in advance.

On the other hand, there are cases where more time is required for parsing, depending on the number of the commands and the types of the commands included in the target application program 32. In such cases, the internal command may not be generated in time to meet the scheduled operation time that is notified in advance.

In such cases, the priority associated with the process for parsing the application program 32 and generating the internal command may be changed in a higher direction. By setting a higher priority, the calculation time or the processor resource allocated to the process can be increased. Therefore, it is possible to complete the generation of the internal command in a shorter time as compared with the case where the priority is maintained.

Figure 11A:
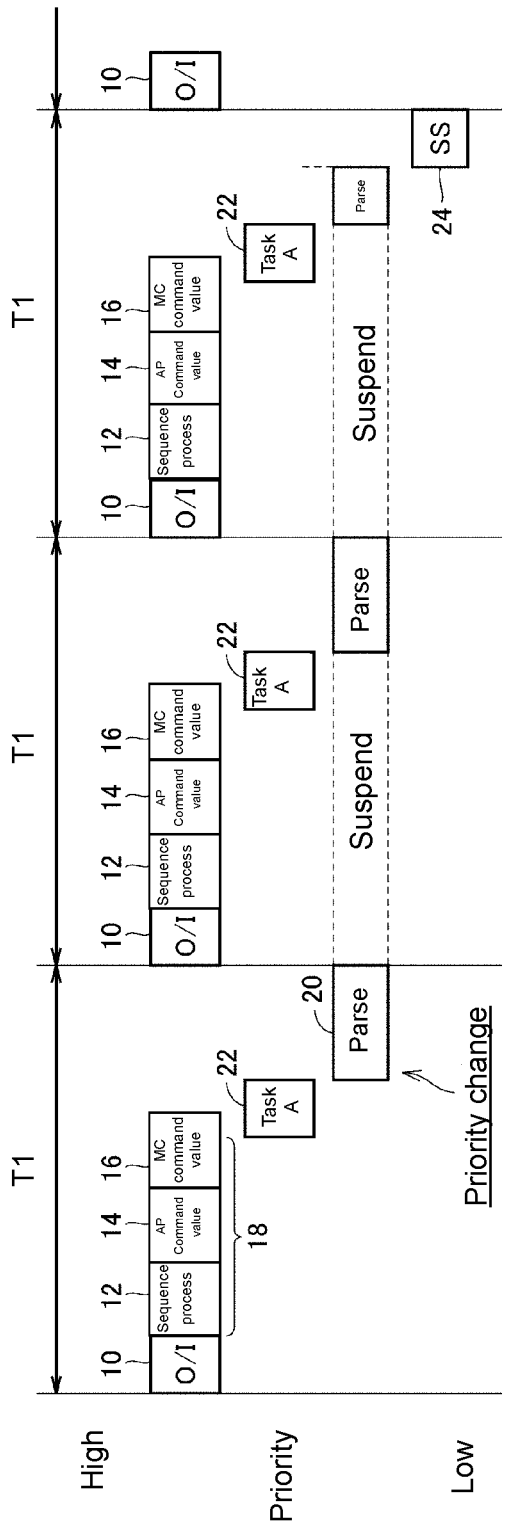
FIG. 11A and FIG. 11B are schematic diagrams for illustrating the effect of change of priority in the control device according to the embodiment.
Figure 11B:
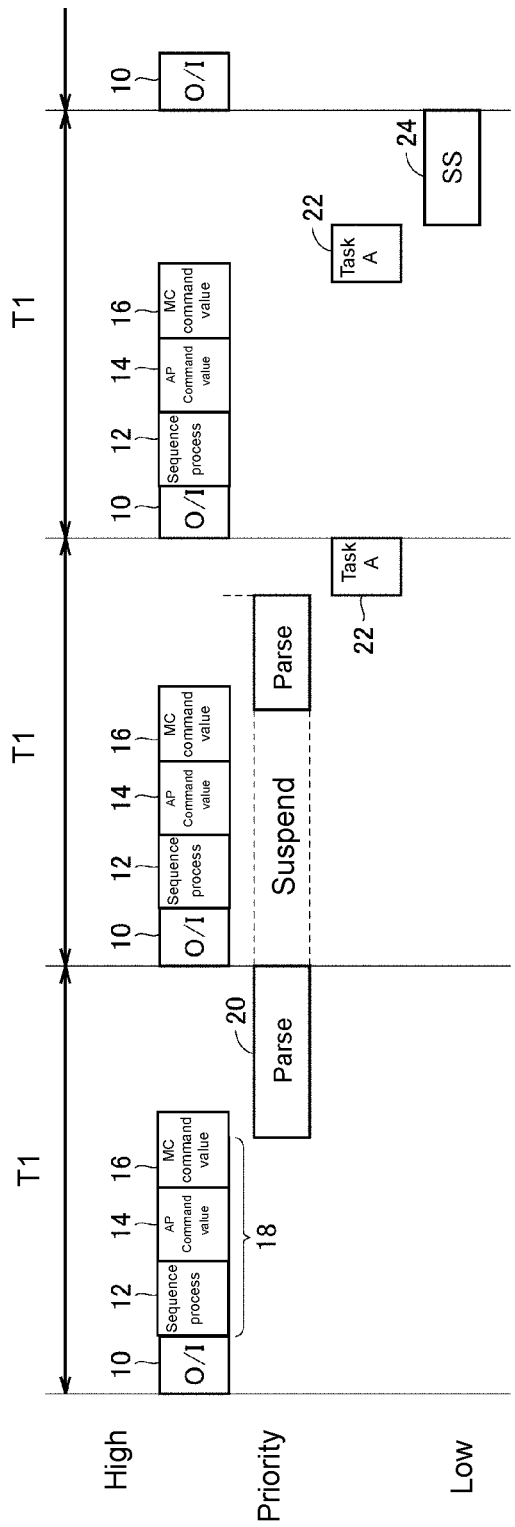

FIG. 11A and FIG. 11B are schematic diagrams for illustrating the effect of change of priority in the control device 100 according to the embodiment. FIG. 11A and FIG. 11B show an example that four types of processes (tasks) are executed in parallel according to different priorities. More specifically, a first task 10 (input/output refresh process) and a second task 18 (including the sequence instruction execution process 12, the output process 14 of the control command according to the application program, and the output process 16 of the control command according to the motion instruction included in the sequence program 30) are shown as tasks with high priority. In addition, a third task 20 (the process of parsing the application program 32 and sequentially generating the internal command 40), a fourth task 22, and a fifth task 24 are shown as tasks with low priority.

The fourth task 22 includes any process provided by the control device 100. The fifth task 24 includes a process such as data communication between the control device 100 and an external device (system service).

In the example shown in FIG. 11A and FIG. 11B, the first task 10 and the second task 18 are repeatedly executed at every control cycle T1. In each control cycle T1, during the period when the first task 10 and the second task 18 are not executed, the third to fifth tasks are executed according to the priority.

In the example shown in FIG. 11A, the processor resource is allocated to the fourth task 22 at every control cycle T1. On the other hand, since the third task 20 is executed only during the period when none of the first task 10, the second task 18, and the fourth task 22 is executed, a time equivalent to three control cycles T1 is required for completing execution of one third task 20. That is, a time that is three times the control cycle T1 is required from the triggering of the third task 20 to completion of the specified process.

Moreover, in the example shown in FIG. 11B, the priority of the third task 20 is set higher than the priority of the fourth task 22. In the example shown in FIG. 11B, the third task 20 is preferentially executed during the period when neither the first task 10 nor the second task 18 is executed, and as a result, the processing for execution of one third task 20 can be completed in a time equivalent to two control cycles T1. That is, the internal command can be generated from the application program 32 in a shorter time.

As shown in FIG. 11A and FIG. 11B described above, when it is determined that the internal command is not generated in time by the scheduled operation time that is notified in advance, the priority that has been set to the task for parsing the application program 32 and generating the internal command may be changed. By changing the priority as described above, the internal command can be generated in time by the scheduled operation time that is notified in advance.

The application program parsing part 160 parses (look ahead) the command included in the application program 32 to a certain extent. In the look ahead operation, when generating the internal command from the command described in the application program 32, the command described after the command that serves as the generation target of the internal command is also referred to. Therefore, the application program parsing part 160 can know in advance not only the command that is currently being processed but also the command that is to be processed next, and can determine in advance whether the generation of the internal command can be completed by the scheduled operation time.

More specifically, when the application arbitration part 162 of the control device 100 receives the processing state of the application program parsing part 160 or the notification from the application program parsing part 160 and learns the situation that the internal command is not generated in time by the scheduled operation time that is notified in advance, the application arbitration part 162 instructs the scheduler 154 to change the priority that has been set to the task related to the generation of the internal command. In response to the priority change instruction, the scheduler 154 changes the priority of the target task and allocates more processor resources, thereby completing generation of the internal command earlier.

That is, when it is determined that the generation of the control command according to the application program 32 falls behind the scheduled operation time (execution start timing), the application arbitration part 162 raises the priority of the task related to the generation of the control command according to the application program 32. Accordingly, the internal command is generated in time to meet the scheduled operation time.

As described above, the priority that has been set to the task for generating the internal command may be changed in consideration of the scheduled operation time that is notified in advance and the generation state of the internal command. Such dynamic change of priority makes it possible to avoid the situation that the cooperative operation cannot be started at the scheduled operation time.

(i4: Processing Procedure)

Next, an example of the processing procedure for realizing the cooperative operation that uses the notification of the scheduled operation time in the control system 1 according to the embodiment will be described.

Figure 12:
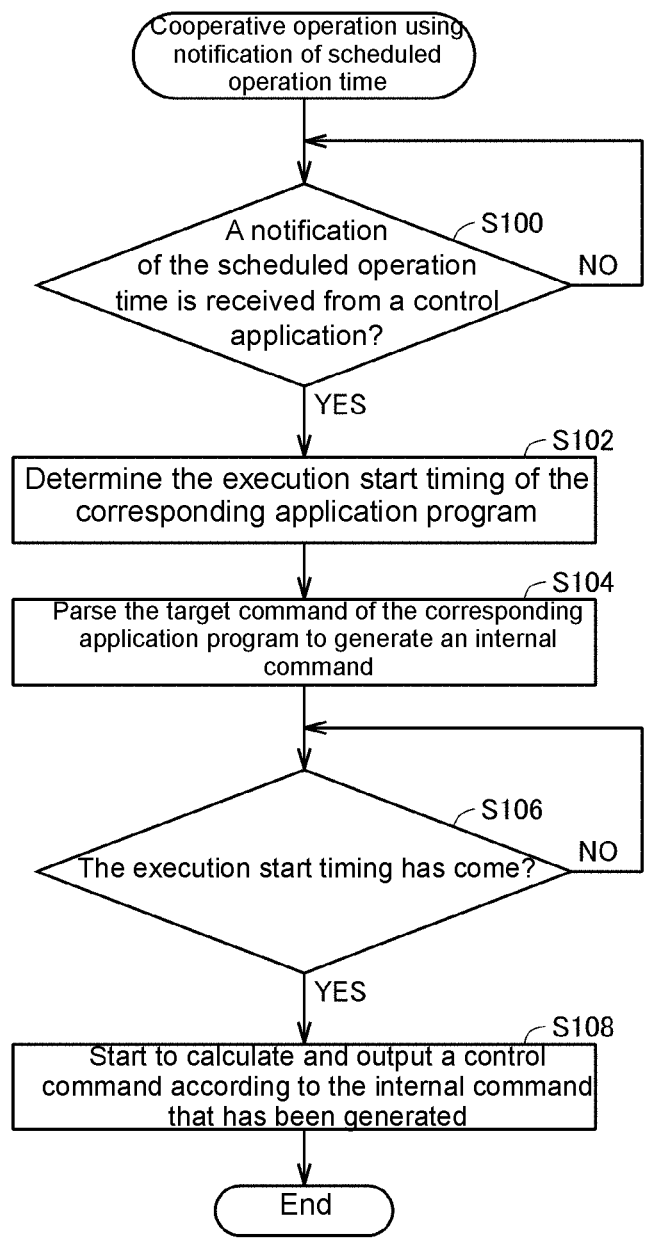
FIG. 12 is a flowchart showing an example of the processing procedure in the control device according to the embodiment.

FIG. 12 is a flowchart showing an example of the processing procedure in the control device 100 according to the embodiment. Typically, each step shown in FIG. 12 is realized by execution of the application program 32 and the system program 34 performed by the processor 102 of the control device 100.

Referring to FIG. 12, the control device 100 determines whether a notification of the scheduled operation time is received from any control application (the CNC machine tool 530 in the above example) (Step S100). When receiving the notification of the scheduled operation time (YES in Step S100), the control device 100 determines the execution start timing of the corresponding application program 32 based on the difference between the notified scheduled operation time and the current time managed by the control device 100 (Step S102). In addition, the control device 100 parses the target command of the corresponding application program 32 to generate an internal command (Step S104).

Then, the control device 100 determines whether the execution start timing determined in Step S102 comes (Step S106). When the execution start timing comes (YES in Step S106), the control device 100 starts calculation and output of a control command according to the internal command that has been generated in Step S104 (Step S108).

By the processing procedure described above, it is possible to realize the cooperative operation that uses the notification of the scheduled operation time.

J. OFFSET TIME

The example described above illustrates that the operations are started at the same time with reference to the scheduled operation time that is notified in advance. However, the disclosure is not limited thereto, and one or both of the operations may be started when the respective offset times lapse with reference to a common scheduled operation time.

Figure 13:
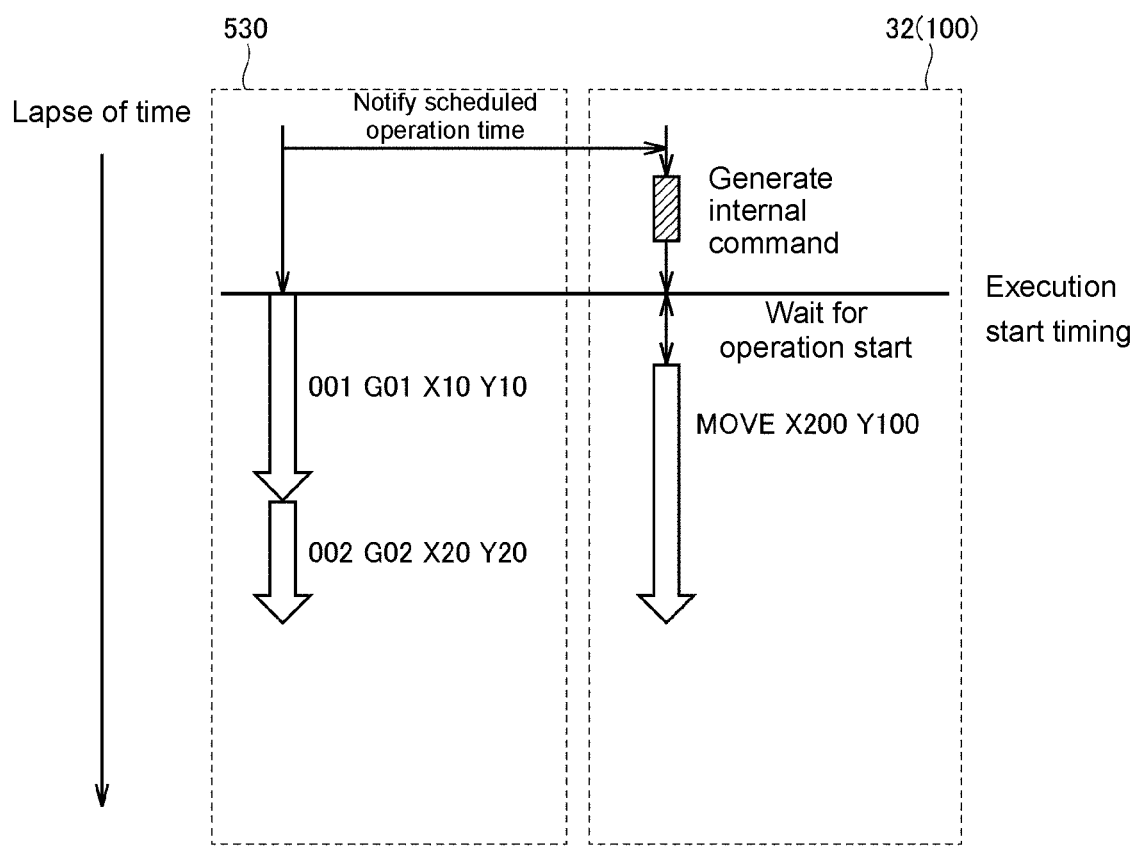
FIG. 13 is a time chart showing an example of the cooperative operation that uses notification of the scheduled operation time in the control system according to the embodiment.

FIG. 13 is a time chart showing an example of the cooperative operation that uses notification of the scheduled operation time in the control system 1 according to the embodiment. Referring to FIG. 13, it is assumed that the operations of the CNC machine tool 530 and the robot 520 are started with any execution start timing as a reference.

When receiving the notification of the scheduled operation time, the control device 100 parses a target command in the application program to generate an internal command. In the example shown in FIG. 13, when the execution start timing that has been notified in advance comes, it waits for a predetermined operation start waiting time to start to output a control command according to the pre-generated internal command. On the other hand, when the execution start timing comes, the CNC machine tool 530 starts the predetermined operation.

Thus, the application arbitration part 162 may adjust the output timing so that the output of the control command according to the application program 32 is started at a timing deviated from the scheduled operation time (execution start timing) notified from the outside by a predetermined time.

As a result, the start of the operation of the robot 520 controlled by the control device 100 is delayed by the predetermined offset time after the start of the operation of the CNC machine tool 530. By setting such an operation delay time, for example, occurrence of interference between the robot 520 and the CNC machine tool 530 can be avoided.

Such an offset time may be set on the sequence program 30 when the application program 32 is activated or may be set as any parameter in advance.

K. APPENDIX

The embodiment described above includes the following technical concepts.
[Configuration 1]
A control system, comprising:
a first control device (100);
a second control device (550) network-connected to the first control device; and
one or more actuators (522, 526, 540) operating according to a control command from the first control device,
wherein the first control device and the second control device comprise timers (TMR) that are synchronized with each other in time,
wherein the first control device comprises:
a first program execution part (152) executing a sequence program at every first cycle to output a first control command;
a parsing part (160) parsing at least a part of a first application program at every second cycle, which is equal to or longer than the first cycle, to sequentially generate an internal command;
a command calculation part (164) outputting a second control command to at least a part of the one or more actuators at every first cycle according to the internal command generated by the parsing part; and
an arbitration part (162) managing a parsing process performed by the parsing part, and
the second control device comprises:
a second program execution part (584) sequentially parsing a second application program to output a third control command to a target movable machine; and
a timing management part (590) notifying in advance the first control device of a timing of outputting the third control command,
wherein the arbitration part adjusts an output timing of the second control command according to the internal command generated by the parsing part in response to notification of the timing from the second control device.
[Configuration 2]
The control system according to configuration 1, wherein the arbitration part determines the output timing of the second control command based on the timing notified from the second control device and a value indicated by the timer of the first control device.

[Configuration 3]
The control system according to configuration 2, wherein the timing notified from the second control device is based on a value managed by the timer (582) of the second control device.
[Configuration 4]
The control system according to configuration 2 or 3, wherein the arbitration part instructs the parsing part to generate the second control command before the output timing of the second control command comes.
[Configuration 5]
The control system according to configuration 4, wherein when determining that the second control command is not generated in time to meet the output timing of the second control command, the arbitration part raises a priority of a task related to generation of the second control command.
[Configuration 6]
The control system according to any of configurations 1 to 5, wherein the arbitration part adjusts the output timing so that output of the second control command is started simultaneously with the timing notified from the second control device.
[Configuration 7]
The control system according to any of configurations 1 to 5, wherein the arbitration part adjusts the output timing so that output of the second control command is started at a timing deviated from the timing notified from the second control device by a predetermined time.
[Configuration 8]
A control device (100) network-connected to a control application, the control device comprising:
a first program execution part (152) executing a sequence program at every first cycle to output a first control command;
a parsing part (160) parsing at least a part of an application program at every second cycle, which is equal to or longer than the first cycle, to sequentially generate an internal command;
a command calculation part (164) outputting a second control command to at least a part of one or more actuators at every first cycle according to the internal command generated by the parsing part; and
an arbitration part (162) managing a parsing process performed by the parsing part based on notification of a timing of outputting a control command from the control application,
wherein the arbitration part adjusts an output timing of the second control command according to the internal command generated by the parsing part in response to notification of the timing from the control application.

L. ADVANTAGES

The control device according to the embodiment can execute one or more application programs in parallel in addition to the sequence program that includes the sequence instruction and the motion instruction. Since the control command can be outputted at every control cycle in such parallel execution, in the control according to the application program, it is possible to achieve the same control accuracy as in the control according to the sequence program.

When executing in parallel the control application controlled by the control command from the control device and the control application controlled by the control command outputted by itself, the control device according to the embodiment can realize the cooperative operation between the multiple control applications based on the scheduled operation time notified from any of the control applications.

It is also possible to make the execution start timings of multiple control applications coincident with each other, or perform the cooperative operation between the control applications with the offset time, which is defined in units of the control cycle. By providing such precise cooperative operation, the equipment can be operated more efficiently, thereby improving the production efficiency.

The embodiments disclosed herein are exemplary and should not be construed restrictive in all aspects. The scope of the disclosure is defined by the claims instead of the above descriptions, and it is intended to include the equivalent of the scope of the claims and all modifications within the scope.

What is claimed is:

1. A control system, comprising:
    a first control device;
    a second control device network-connected to the first control device; and
    one or more actuators operating according to a control command from the first control device,
    wherein the first control device and the second control device comprise timers that are synchronized with each other in time,
    wherein the first control device comprises:
    a first program execution part executing a sequence program at every first cycle to output a first control command to at least a part of the one or more actuators;
    a parsing part parsing and executing at least a part of a first application program at every second cycle, which is equal to or longer than the first cycle, to sequentially generate an internal command, the internal command being a function defining a relationship between time and a command value;
    a command calculation part calculating a second control command to be outputted to at least a part of the one or more actuators at every first cycle according to the internal command generated by the parsing part, and outputting the second control command according to the first application program at a same cycle as an output cycle of the first control command calculated by execution of the sequence program; and
    an arbitration part managing the parsing process performed by the parsing part, and
    the second control device comprises:
    a second program execution part sequentially parsing a second application program to output a third control command to a target movable machine; and
    a timing management part notifying in advance the first control device of a timing of outputting the third control command,
    wherein the arbitration part adjusts an output timing of the second control command according to the internal command generated by the parsing part in response to notification of the timing from the second control device.

2. The control system according to claim 1, wherein the arbitration part determines the output timing of the second control command based on the timing notified from the second control device and a value indicated by the timer of the first control device.

3. The control system according to claim 2, wherein the timing notified from the second control device is based on a value managed by the timer of the second control device.

4. The control system according to claim 3, wherein the arbitration part instructs the parsing part to generate the second control command before the output timing of the second control command comes.

5. The control system according to claim 4, wherein when determining that the second control command is not generated in time to meet the output timing of the second control command, the arbitration part raises a priority of a task related to generation of the second control command.

6. The control system according to claim 5, wherein the arbitration part adjusts the output timing so that output of the second control command is started simultaneously with the timing notified from the second control device.

7. The control system according to claim 4, wherein the arbitration part adjusts the output timing so that output of the second control command is started simultaneously with the timing notified from the second control device.

8. The control system according to claim 3, wherein the arbitration part adjusts the output timing so that output of the second control command is started simultaneously with the timing notified from the second control device.

9. The control system according to claim 3, wherein the arbitration part adjusts the output timing so that output of the second control command is started at a timing deviated from the timing notified from the second control device by a predetermined time.

10. The control system according to claim 2, wherein the arbitration part instructs the parsing part to generate the second control command before the output timing of the second control command comes.

11. The control system according to claim 10, wherein when determining that the second control command is not generated in time to meet the output timing of the second control command, the arbitration part raises a priority of a task related to generation of the second control command.

12. The control system according to claim 11, wherein the arbitration part adjusts the output timing so that output of the second control command is started simultaneously with the timing notified from the second control device.

13. The control system according to claim 11, wherein the arbitration part adjusts the output timing so that output of the second control command is started at a timing deviated from the timing notified from the second control device by a predetermined time.

14. The control system according to claim 10, wherein the arbitration part adjusts the output timing so that output of the second control command is started simultaneously with the timing notified from the second control device.

15. The control system according to claim 10, wherein the arbitration part adjusts the output timing so that output of the second control command is started at a timing deviated from the timing notified from the second control device by a predetermined time.

16. The control system according to claim 2, wherein the arbitration part adjusts the output timing so that output of the second control command is started simultaneously with the timing notified from the second control device.

17. The control system according to claim 2, wherein the arbitration part adjusts the output timing so that output of the second control command is started at a timing deviated from the timing notified from the second control device by a predetermined time.

18. The control system according to claim 1, wherein the arbitration part adjusts the output timing so that output of the second control command is started simultaneously with the timing notified from the second control device.

19. The control system according to claim 1, wherein the arbitration part adjusts the output timing so that output of the second control command is started at a timing deviated from the timing notified from the second control device by a predetermined time.

20. A control device network-connected to a control application, the control device comprising:
- a first program execution part executing a sequence program at every first cycle to output a first control command to at least a part of one or more actuators;
- a parsing part parsing and executing at least a part of an application program at every second cycle, which is equal to or longer than the first cycle, to sequentially generate an internal command, the internal command being a function defining a relationship between time and a command value;
- a command calculation part calculating a second control command to be outputted to at least a part of one or more actuators at every first cycle according to the internal command generated by the parsing part, and outputting the second control command according to the application program at a same cycle as an output cycle of the first control command calculated by execution of the sequence program; and
- an arbitration part managing the parsing process performed by the parsing part based on notification of a timing of outputting a control command from the control application,
- wherein the arbitration part adjusts an output timing of the second control command according to the internal command generated by the parsing part in response to notification of the timing from the control application.

* * * * *